United States Patent [19]

Spindler

[11] Patent Number: 4,582,242

[45] Date of Patent: Apr. 15, 1986

[54] METHOD OF MAKING FORMED END METAL PRODUCTS

[76] Inventor: Dietmar E. Spindler, 50747 Regency Park Dr., Granger, Ind. 46530

[21] Appl. No.: 641,703

[22] Filed: Aug. 17, 1984

[51] Int. Cl.$^4$ .............................................. B23K 19/02
[52] U.S. Cl. ................... 228/113; 228/173.5
[58] Field of Search ................. 228/112–114, 228/173.3, 173.5, 2; 72/316, 318

[56] References Cited

U.S. PATENT DOCUMENTS

| 245,691 | 8/1881 | Alker | 72/318 |
|---|---|---|---|
| 2,257,335 | 9/1941 | Evans et al. | 113/112 |
| 2,258,751 | 10/1941 | Evans | 29/157 |
| 3,126,625 | 3/1964 | Laing | 29/470.3 |
| 3,323,203 | 6/1967 | Hollander et al. | 29/470.3 |
| 3,417,457 | 12/1968 | Burke et al. | 228/112 |
| 3,444,611 | 5/1969 | Bogart | 29/470.3 |
| 3,504,425 | 4/1970 | Sutovsky et al. | 29/470.3 |
| 4,432,662 | 2/1984 | Ronnkuist | 228/113 X |

FOREIGN PATENT DOCUMENTS

| 780095 | 3/1968 | Canada | 72/318 |
|---|---|---|---|
| 0130006 | 3/1978 | Fed. Rep. of Germany | 228/112 |
| 4006024 | 2/1974 | Japan | 228/112 |
| 1398714 | 6/1975 | United Kingdom | 228/112 |
| 0688309 | 9/1979 | U.S.S.R. | 228/114 |

OTHER PUBLICATIONS

Oakmar Industries, Inc. brochure, "Announcing a Technological Break Through in the Manufacture of Sucker Rods".

Primary Examiner—Nicholas P. Godici
Assistant Examiner—Carmine Cuda
Attorney, Agent, or Firm—Barnes & Thornburg

[57] ABSTRACT

A method and apparatus for making a formed end metal product uses a welding apparatus to perform a forging operation on the end of an elongate metal member. The metal member is located in a workholder of a welding apparatus of the type having a second opposing workholder and a mechanism, such as a hydraulic cylinder, for developing a compressive force between the workholders. The end of the elongate member is upset forged by a die mounted in one, or both, of the workholders. Following the forging operation, a formed end is located in the second workholder and welded to the end of the elongate member. A heating step can be used if hot forging is required. Preferred types of welding apparatus include friction welders, inertial welders, and flash butt welders.

12 Claims, 11 Drawing Figures

METHOD OF MAKING FORMED END METAL PRODUCTS

BACKGROUND AND SUMMARY OF THE INVENTION

This invention relates in general to the manufacture of formed end metal products and, in particular, to a method and apparatus for making such products.

Formed end metal products are produced for a variety of applications, including truck and automobile axles, tie rods for anchoring utility poles, and sucker rods for use in well drilling applications. These products comprise a forged or machined end, such as a threaded box or pin, a hook, an eye, or other formed shape, attached to or formed on the end of any elongate metal member, such as a rod, bar or tube. The formed end may be directly forged or machined to the desired shape from the rod, bar or tube stock to form a unitary finished product having superior qualities. However, the cost associated with directly forming or machining an end of the elongate metal member are relatively high. This is particularly true in the case of large products, such as sucker rods, which often exceed 30 feet in length. Handling of such products for machine or forging operations can be difficult and expensive.

Because of the difficulties involved in directly forging or machining the formed end products, a welding process is often used to attach a preformed end to the end of the elongate member. Welding processes particularly well suited for this application include friction welding, inertia welding, and flash butt welding. However, formation of a weld joint in the product often introduces a "weak link" which maybe unacceptable. Cleanliness of the steel, reorientation of weld metal, and heat affected zones produced by the welding process all may contribute to formation of a weld joint which directly or indirectly weakens the product. In corrosive environments, the joint will be attacked first due to flow line reorientation in the weld. Thus, the weld joint will become the starting point for stress corrosion failure.

In many applications which require a high degree of safety and reliability, introduction of weaknesses such as those described above is unacceptable. One solution to this problem is to increase the size (i.e., cross-section) of the elongate member and the formed end at the weld joint to increase the strength at this point. This can be accomplished by simply using an oversized elongate member and formed end. Alternatively, the end of the member can be upset (enlarged) in a forging operation to provide a weld joint which is at least as strong as the base material of the elongate member. However, utilization of either of these solutions is likely to seriously erode, or completely eradicate, the cost savings associated with the use of a welding process in fabricating the formed end products.

Accordingly, it is an object of this invention to provide an improved method and apparatus for the manufacture of formed end metal products.

Another object of this invention is to provide a method for the manufacture of formed end metal products in which a forging operation can be efficiently and economically employed to upset an end of an elongate metal member.

A still further object of this invention is to provide apparatus which allows an upset forging operation to be performed on an elongate metal member while the member is positioned in a welding apparatus.

Yet another object of this invention is to provide a method in which a welding apparatus can be used to perform an upset welding operation to enlarge the end of an elongate member.

These and other objects of the invention are achieved in a method of making a formed end metal product which comprises the steps of locating an elongate metal member in a first workholding means of a welding apparatus, locating a forging die in a second workholding means of the welding apparatus, upsetting an end of the elongate member by means of a compressive force developed by the welding apparatus, said force acting to press the forging die against the end of the member, locating a formed end in the second workholding means of the welding apparatus, and welding the formed end to the upset end of the elongate member. The end of the elongate member may be cold forged or, alternatively, hot forged by the welding apparatus. In the latter case, the end of the member is preferably heated by inductive heating means or by the passage of an electric current through the end of the member, while it is mounted in the workholding means of the welding apparatus. The end of the elongate member may alternatively be heated prior to locating the member in the first workholding means. The elongate member is preferably located in the first workholding means such that, subsequent to the forging step, the forged end of the elongate member extends beyond the die insert to facilitate the welding step. The forging die, the formed end, and the elongate member may be located in the welding apparatus by manual or by automatic loading means.

The apparatus required for making a formed end metal product, according to the method of present invention, comprises a welding apparatus having a first workholding means for holding the elongate metal member, a second workholding means, and means for developing a compressive force between the first and second workholding means. A forging die, adapted for mounting in the workholding means, forms a die cavity around the end of the elongate metal member. The end of the elongate metal member is forged into conformity with the die cavity by means of the compressive force developed by the welding apparatus. The forging die is preferably formed in two parts. A first die, adapted for mounting in the first workholding means, forms at least a portion of the die cavity around the end of the elongate member. A second die, adapted for mounting in the second workholding means, has a centralized depression which also forms a portion of the die cavity. The apparatus further comprises means for heating the end of the elongate member prior to the forging step. The heating means may comprise an inductive heating means or means for passing an electrical current through the end of the elongate member. Preferred welding apparatus for performing the method of the present invention include friction welders, inertial welders, and flash butt welders.

Additional objects and advantages of the present invention will be apparent from the following detailed description of a preferred embodiment, when considered in conjunction with the accompanying drawings.

DETAILED DESCRIPTION OF THE DRAWINGS

Figure 1:
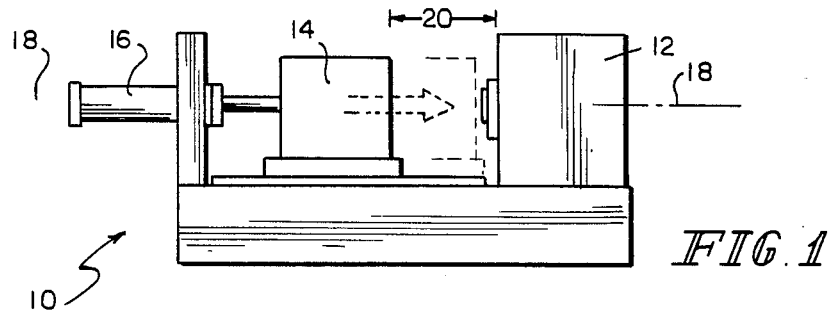
FIG. 1 shows, generally, a welding apparatus of the type which can be used in the method of the present invention.

FIG. 1 shows a welding apparatus, indicated generally by reference number 10, of the type used in the method of the present invention. Welding apparatus 10 includes first work holder 12, second workholder 14 and hydraulic cylinder 16. In a preferred embodiment of the invention, workholder 12 is the stationary tailstock of a friction welding apparatus and workholder 14 is the moveable headstock, or spindle, of the friction welder. Hydraulic cylinder 16 moves workholder 14 laterally along axis 18, as indicated by double-headed arrow 20 in FIG. 1. When hydraulic cylinder 16 is extending (i.e., workholder 14 is moving toward workholder 12), a compressive force is developed between the two workholders. As will be described below, this compressive force is utilized to perform a forging operation on the end of a member held by workholder 12. It should be noted that the method of the present invention is not limited to applications using only a friction (or inertial) type welding apparatus. Other welding apparatus having a similar arrangement of workholders and means for developing a compressive force between the workholders may be used as well. For example, a flash butt welding apparatus may be used. For reasons which will be discussed more fully below, use of a flash butt welder is a particularly advantageous arrangement when the member to be forged must be heated prior to forging.

Figure 2:
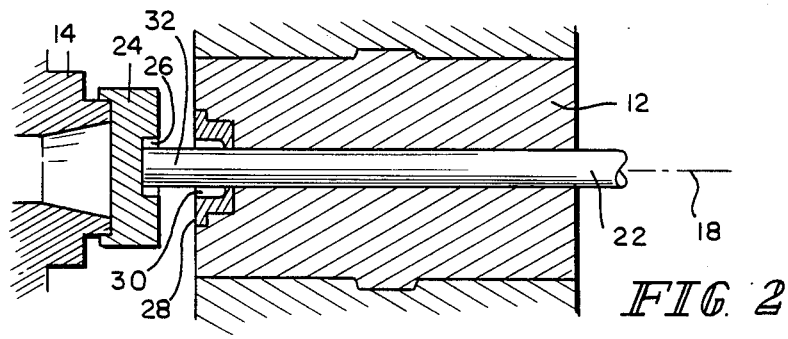
FIG. 2 shows an enlarged view of the workholders of the welding apparatus of FIG. 1, with the forging die and elongate member in position, prior to the forging step.
Figure 3:
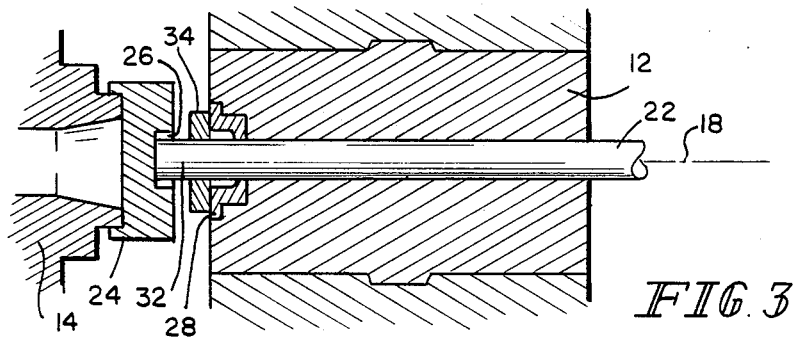
FIG. 3 shows the enlarged view of FIG. 2 with the addition of an inductive heating ring around the end of the elongate member.
Figure 4:
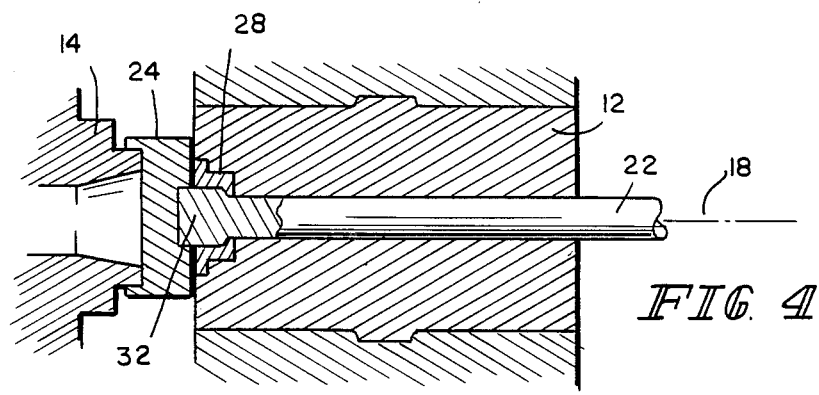
FIG. 4 shows the apparatus of FIG. 2, subsequent to the upset forging operation.

FIGS. 2 through 6 illustrate a preferred operating sequence for the present inventive method. As shown in FIG. 2, an elongate metal member 22 is located in workholder 12. A forging die 24 is similiarly located in workholder 14. Although forging die 24 can be formed as a generally flat die, the preferred embodiment shown in FIG. 2 is provided with a depression 26 which is centralized around axis 18. Depression 26 forms a portion of a die cavity used in the forging operation. The remainder of the die cavity is formed by die insert 28 which is located in the end of workholder 12. The portion of the die cavity formed by die insert 28 around the end of elongate member 22 is indicated in FIG. 2 by reference numeral 30. As illustrated in FIG. 4, this arrangement is preferred so that the forged end of elongate member 22 will extend beyond die insert 28 and workholder 12 after the forging operation to facilitate the subsequent welding step.

If a cold forging operation is to be performed, this operation can proceed, as illustrated in FIG. 4, after locating forging die 24 and member 22 in respective workholders 14 and 12. Since the length of the upset end and the increase in cross-sectional diameter required are often relatively small, cold forging can be utilized to produce a number of products. However, if a hot forging operation is required, end 32 of member 22 can be heated by a heating means which, in this preferred embodiment, is an inductive heating ring 34. If a flash butt welding apparatus is used, a particularly advantageous heating arrangement results. Heating is accomplished by moving workholder 14 forward to bring forging die 24 into contact with end 32. Electric current is then permitted to flow through end 32 to effect the desired heating. An alternative to heating end 32 while member 22 is located in workholder 12 is to perform the heating step prior to mounting member 22 in the workholder. While this approach may offer advantages in particular situations, the heating of end 32 as illustrated in FIG. 3 is generally preferred.

Following the heating step (if used), the forging operation is initiated by increasing the pressure in hydraulic cylinder 16. This causes workholder 14 to move toward workholder 12, resulting in development of the compressive force which forges end 32 into conformity with the walls of the die cavity. Thus, a forging operation which normally requires a separate specialized appliance, such as a hydraulic press or horizontal forging machine, is performed by the welding apparatus. FIG. 4 illustrates the condition of the various components at the end of the forging operation. End 32 of member 22 is upset, as shown in FIG. 4, into conformance with the die cavity formed by depression 26 and die insert 28. Depression 26 is dimensioned (and member 22 is positioned) such that end 32 extends beyond die insert 28 and workholder 12 when the forging process is completed.

Figure 5:
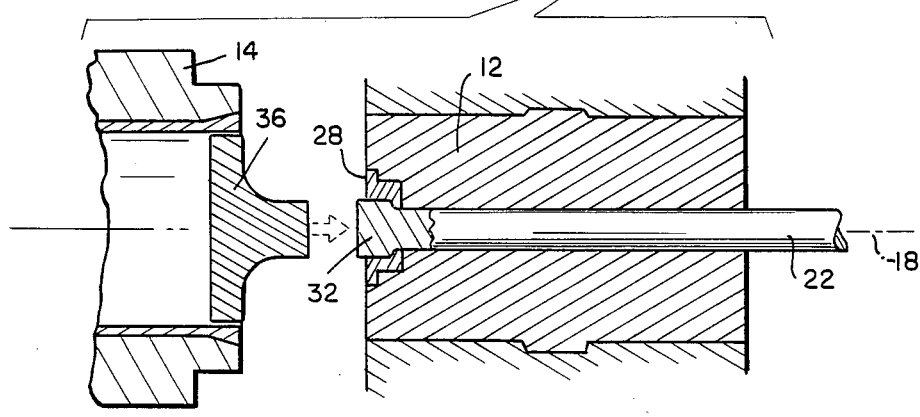
FIG. 5 shows the apparatus of FIG. 4 after replacement of the forging die with a formed end member and prior to the welding step.

FIG. 5 shows the apparatus of FIG. 4 after forging die 24 is removed from workholder 14 and formed end 36 is mounted in its place. Forging die 24, as well as formed end 36 and elongate member 22, may be positioned in and/or removed from workholders 12 and 14 manually or, alternatively, by automatic loading and unloading systems.

Figure 6:
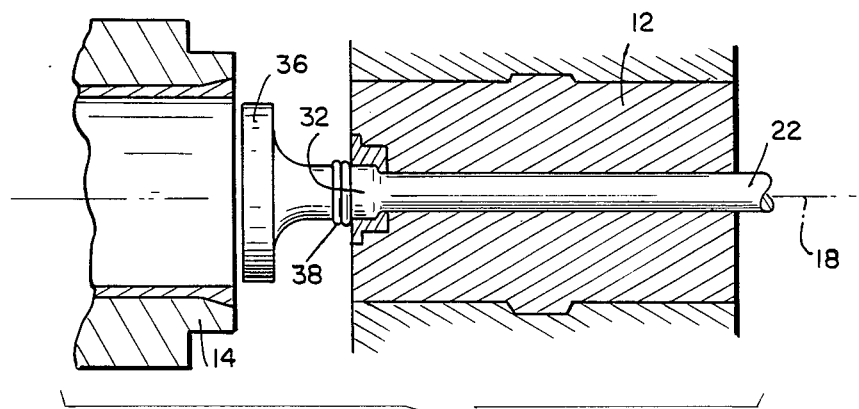
FIG. 6 shows the apparatus of FIG. 5, subsequent to welding of the formed end to the forged end of the elongate member.
Figure 7:
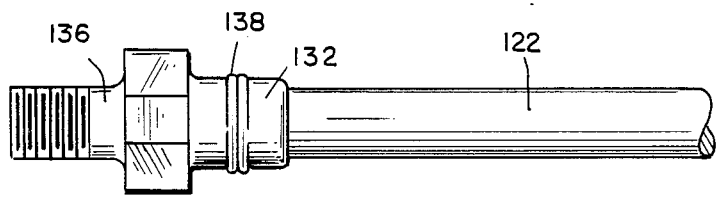
FIG. 7 shows a tie rod manufactured by the method and apparatus of the present invention.
Figure 8A:
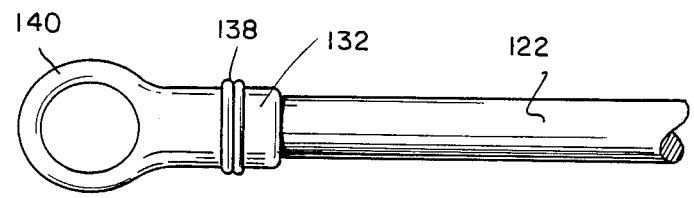
FIGS. 8a and 8b show alternative embodiments of the tie rod of FIG. 7.
Figure 8B:
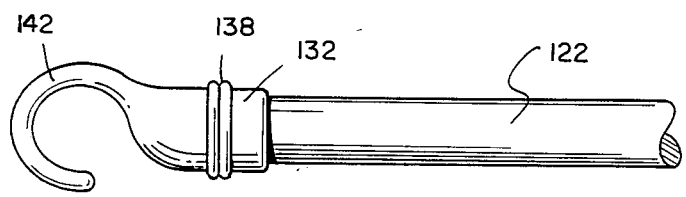

FIG. 6 illustrates the final step in the method of the present invention which is the welding of formed end 36 to end 32 of elongate member 22. If a friction welding apparatus is used, welding is accomplished by rotating formed end 36 while workholder 14 is advanced under pressure toward workholder 12. When formed end 36 contacts end 32, a weld joint is formed as indicated at 38. FIGS. 7 through 10 illustrate embodiments of particular products formed by the method and apparatus of the present invention. FIG. 7 shows a tie rod which includes a threaded, formed end 136 and an elongated metal member 122. End 132 of elongate member 122 has been upset in a welding apparatus of the type described above, prior to formation of weld joint 138 by that same welding apparatus. FIGS. 8a and 8b show additional embodiments of the tie rod of FIG. 7 which have formed ends 140 and 142, respectively, attached to end 132 of elongate member 122.

Figure 9:
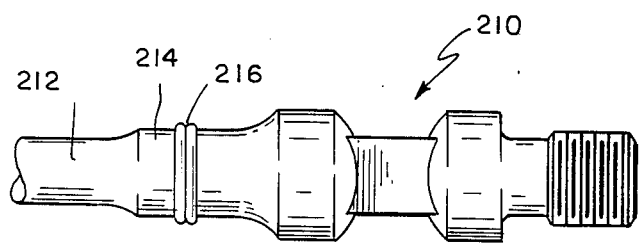
FIG. 9 shows the end portion of a sucker rod manufactured by the method and apparatus of the present invention.

FIG. 9 shows a portion of a sucker rod, of the type used in oil well drilling operations, which has been manufactured by the method of the present invention. The sucker rod in FIG. 9 includes a threaded, pin-type formed end 210 and an elongate body 212. End portion 214 of body 212 has been upset, according to the method of the present invention, prior to being welded, at 216, to formed end 210.

Figure 10:
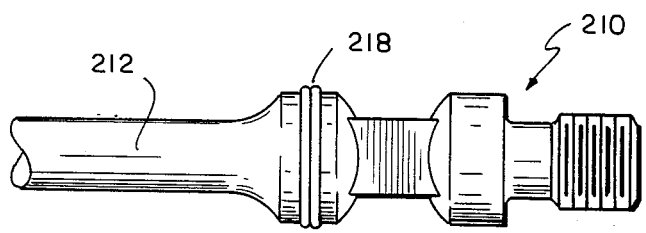
FIG. 10 shows an alternative embodiment of the sucker rod of FIG. 9.

FIG. 10 shows another embodiment of the sucker rod wherein weld 218 is formed in a different cross-sectional plane of formed end 210.

The method and apparatus of the present invention may be used to form other products (e.g., automobile and truck axles) which require both an upsetting and a welding operation. Certain variations in the method will be obvious to those skilled in the art. For example, the part to be forged can be mounted in workholder 14 (i.e., the rotating spindle of a friction welder), rather than workholder 12. Furthermore, either of the parts to be welded may be rotated by workholder 14. Accordingly, the spirit and scope of the present invention is not intended to be limited to the detailed embodiment described above but, rather, is to be limited only by the scope of the following claims.

What is claimed:

1. A method of making a formed end metal product comprising the steps of:
    a. locating an elongate metal member in a first workholding means of a welding apparatus;
    b. locating a forging die in at least one of the first workholding means and a second workholding means of said welding apparatus;
    c. upsetting an end of the elongate metal member by means of a compressive force developed by the welding apparatus, said force acting to forge the end of the elongate member into conformity with the forging die;
    d. locating a formed end in the second workholding means; and
    e. welding the formed end to the forged end of the elongate member prior to removing the elongate member from the first workholding means.

2. The method according to claim 1, comprising the additional step of heating the end of the elongate member prior to the upsetting step.

3. The method according to claim 2, wherin said heating step is accomplished by inductive heating means.

4. The method according to claim 2, wherein said heating step is accomplished by passing an electric current through the end of the elongate member.

5. The method according to claim 1, wherein the end of the elongate member is heated prior to being located in the first workholding means.

6. The method according to claim 1, wherein at least one of the group which includes the elongate member, the forging die, and the formed end is located in the welding apparatus by automatic means.

7. The method according to claim 1, wherein the forging die is provided with a centralized depression, said depression forming at least a portion of a die cavity and wherein the end of the elongate member is forged into conformity with the die cavity by said compressive force.

8. The method according to claim 1, wherein the first workholding means of the welding apparatus is provided with a die insert which forms at least a portion of a die cavity around the end of the elongate member, and wherein the end of the elongate member is forged into conformity with the die cavity by said compressive force.

9. The method according to claim 8, wherein the elongate member is located in the first workholding means such that, subsequent to the forging step, the forged end of the elongate member extends beyond said die insert to facilitate the welding step.

10. The method according to claim 1, wherein the welding apparatus is a friction welder.

11. The method according to claim 1, wherein the welding apparatus is an inertial welder.

12. The method according claim 1, wherein the welding apparatus is a flash butt welder.

* * * * *